March 29, 1927.
J. M. WANAMAKER
CUTTER BAR CONNECTING ROD
Filed Jan. 8, 1924
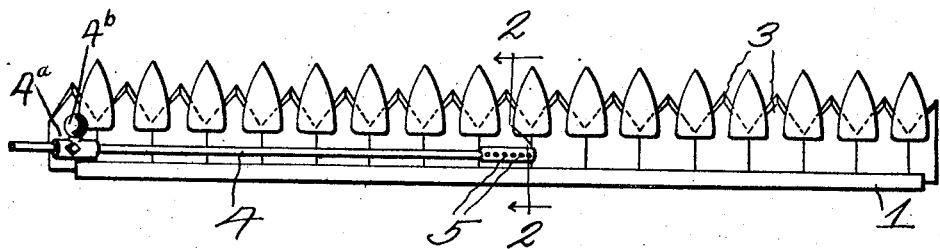
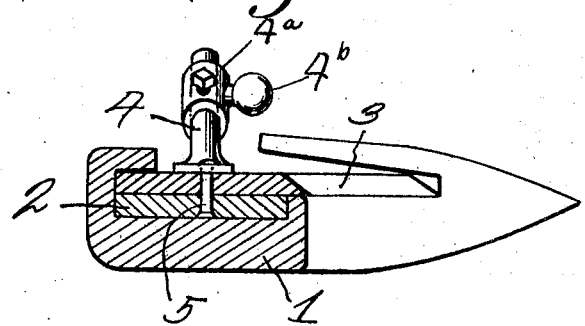
Inventor
J. M. Wanamaker
By
Attorney Patented Mar. 29, 1927.

1,622,299

UNITED STATES PATENT OFFICE.

JOHN M. WANAMAKER, OF TRENTON, MISSOURI.

CUTTER-BAR CONNECTING ROD.

Application filed January 8, 1924. Serial No. 684,992.

The invention relates to connecting rod connections for cutter bars of mowing machines, and has for its object to provide a connecting rod, which is attached to the cutter bar centrally thereof, as distinguished from adjacent its end, thereby reducing the amount of twisting strain on the cutter bar, and applying the power to the cutter bar closer to any point of jamming of the cutter bar, as for instance, if a stick should come into contact with the cutters during a mowing operation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a top plan view of a cutter bar and guard, showing the connecting rod attached thereto.

Figure 2 is a transverse sectional view taken on line 2—2 of Figure 1.

Figure 3 is a rear elevation of the device and cutter bar.

Referring to the drawing, the numeral 1 designates a conventional form of cutter bar guard, 2 the cutter bar and 3 the cutters which are secured to the cutter bar in the usual manner. Heretofore connecting rods have been connected to the cutter bar adjacent the inner end thereof. It will therefore be seen that the strain on the cutter bar is considerable, especially when the cutters are engaged by a stick or the like, for instance a stick adjacent the outer end of the cutter bar, at which time a bending strain is imparted on the cutter bar, and a binding action on the bar incident to the flexing of the bar in the guard. To obviate this difficulty the connecting rod 4 is connected to the cutter bar 2 substantially centrally thereof, and preferably by rivets 5, therefore, it will be seen that during a cutting operation, the strain will only be on one half the bar, and the bar will not easily flex on account of the shortness thereof incident to the connecting rod being connected centrally of the cutter bar.

The connecting rod 4 may lead to any suitable position and may be of any suitable construction and driven in any conventional manner. However, the rod 4 is provided with a sleeve $4^a$ having a ball $4^b$ on one side thereof to which a conventional form of pitman may be connected.

From the above it will be seen that a mowing machine cutter bar is provided with a driving connecting rod, which rod is centrally connected to the cutter bar, thereby reducing the strain on the cutter bar as a whole, during the reciprocation thereof, in case of jamming or cutting heavy material. It will also be seen that the portion of the bar, which is under strain during a cutting operation will not flex materially, as is the case where the connecting rod is connected to the end of the cutter bar.

The invention having been set forth what is claimed as new and useful is:—

The combination with a mowing machine cutter bar, a cutter guard in which said bar is slidably mounted, said cutter bar and guard being substantially horizontally disposed, of a flexible operating rod, one end of said operating rod being rigidly and nonmovably connected to the cutter bar substantially centrally thereof, said flexible operating rod inclining upwardly and outwardly towards one end of the cutter bar.

In testimony whereof I have signed my name to this specification.

JOHN M. WANAMAKER.